United States Patent [19]

LeMay

[11] 4,056,975
[45] Nov. 8, 1977

[54] MASS FLOW SENSOR SYSTEM

[75] Inventor: Dan B. LeMay, Palos Verdes Estates, Calif.

[73] Assignee: Tylan Corporation, Torrance, Calif.

[21] Appl. No.: 656,543

[22] Filed: Feb. 9, 1976

[51] Int. Cl.² ............................ G01F 1/68; G01F 5/00
[52] U.S. Cl. ......................................... 73/202; 73/204
[58] Field of Search .................................. 73/204, 202

[56] References Cited

U.S. PATENT DOCUMENTS

| 2,594,618 | 4/1952 | Booth, Jr. | 73/204 |
| 2,729,976 | 1/1956 | Laub | 73/204 |
| 3,181,357 | 5/1965 | Benson | 73/204 |
| 3,246,523 | 4/1966 | Richard | 73/204 |
| 3,802,264 | 4/1974 | Poppendien et al. | 73/204 |
| 3,818,758 | 6/1974 | Easter | 73/204 |

FOREIGN PATENT DOCUMENTS

| 1,255,331 | 11/1967 | Germany | 73/204 |
| 2,350,848 | 4/1974 | Germany | 73/204 |
| 876,484 | 5/1953 | Germany | 73/204 |

Primary Examiner—Herbert Goldstein
Attorney, Agent, or Firm—Nilsson, Robbins, Dalgarn, Berliner, Carson & Wurst

[57] ABSTRACT

A mass flow sensor system for measuring the flow rate of a fluid in a sensing tube at diverse angular attitudes. Output signal distortion is minimized by neutralizing the effects of convection forces. The sensing tube is formed as a by-pass coupled to a fluid conduit and includes a loop in the shape of a single-turn helix. Circulation of the fluid through the loop cancels gravity-induced convection forces caused by temperature gradients and significantly reduces sensitivity to attitude change. A center-tapped temperature-sensitive resistor coil is wound around the outer surface of the loop. The coil is heated, and the temperature differential between the ends of the coil, corresponding to rate of mass flow, is detected as a voltage output signal generated in an associated bridge circuit.

25 Claims, 5 Drawing Figures

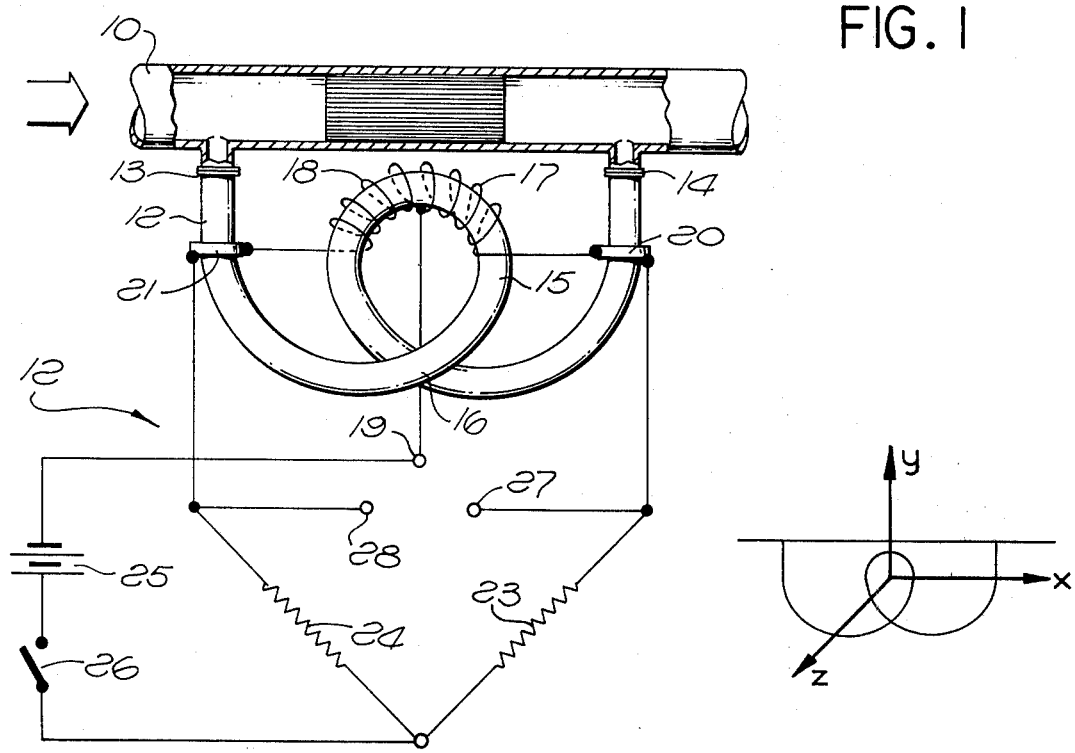
FIG. 1
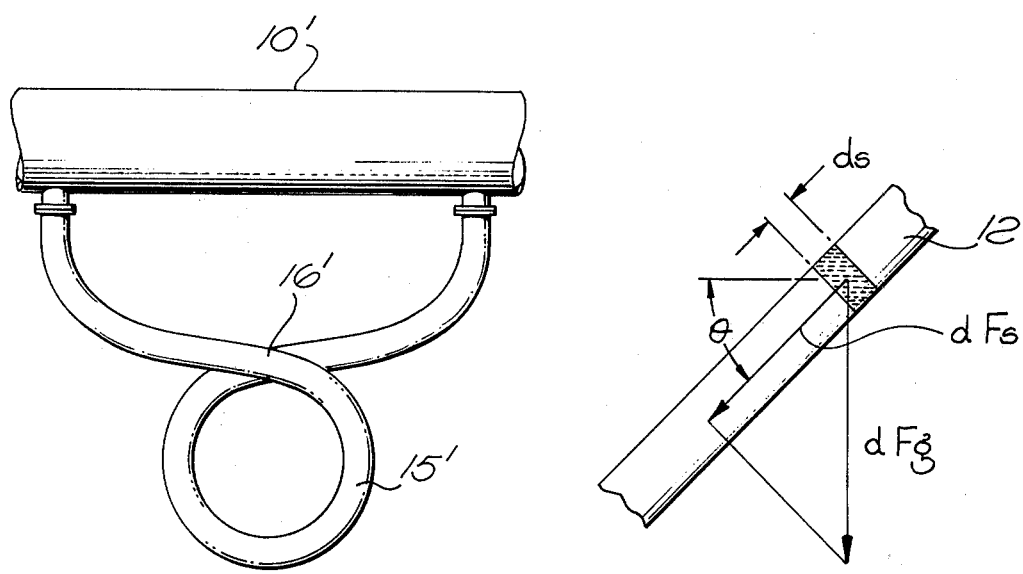
FIG. 2
FIG. 3

MASS FLOW SENSOR SYSTEM

FIELD OF THE INVENTION

The field of art to which the invention pertains includes the field of fluid flow sensing, particularly with respect to methods and apparatus for measuring the flow of a fluid.

BACKGROUND AND SUMMARY OF THE INVENTION

In conventional mass flow meters, heat is applied to a sensing tube conducting the fluid to be measured or is directly applied to a fluid and the temperature of the fluid is measured before and after the addition. When the upstream temperature is equal to the unheated stream temperature, mass flow can be measured as inversely proportional to the temperature difference for a constant heat addition. A conventional bridge circuit can be used to obtain an electrical signal versus flow function. In another arrangement, heat is applied to a sensing tube and the temperature of the tube measured before and after the heat addition. The upstream temperature of the fluid is influenced by the heating of the tube and is nearly equal to the heater temperature at zero flow. The mass flow of the fluid is proportional to the temperature differential for a constant heat addition. In a third arrangement, heat is applied to a very small wire, probe or thermistor in the fluid stream and the cooling effect of the fluid stream is measured. Cooling of the element is a function of the mass flow. In still another arrangement, heat is applied uniformly to a tube by resistance heating and the cooling effect of the fluid is measured with thermocouples to determine mass flow.

In yet another arrangement, described in detail in copending application Ser. No. 381,455, filed July 23, 1973, a pair of temperature-sensitive resistance coils are wound around the outer surface of a sensing tube; the coils are heated, and the rate of mass flow of the fluid passing through the tube is measured by a bridge circuit connected to the coils and expressed by voltage output signals. Advantageous features of such an arrangement such as the fast response of the sensor coils or the accuracy of the bridge ratio over wide ambient temperature ranges are, however, offset by disadvantages arising from its attitude-sensitivity which distorts the signals when the tube is tilted. Such sensitivity arises from both internal and external convection currents. In accordance with the invention described and claimed in the above-mentioned application, signal distortion due to external convection currents can be greatly reduced by encasing the sensor coils on the tube in open cell foam. Such insulation is capable of reducing the attitude sensitivity of the metering device by a factor of 100 or more. However, internal convection effects are not reduced. Although small for low-density fluids, e.g. for oxygen at a pressure of 60 psi, in a vertically aligned conduit and for oxygen at a pressure of 1000 psi, the internal convection effect is approximately ± 8% of full scale sensor output at no flow.

The present invention reduces the attitude sensitivity of known mass flow meters by eliminating or minimizing the effects of internal as well as of external convection forces. This is accomplished by modifying the shape of the sensing tube. More specifically, the sensing tube is provided with a loop in the form of a single-turn helix which forms a continuous passage for the fluid. In following the arcuate path defined by the loop, the fluid undergoes a reversal of flow direction which has the result of cancelling the effect of convection currents. A temperature gradient developed between a pair of heated, temperature-responsive sensors on the outer surface of the loop, and converted into output signals through an electrical circuit associated with the sensors, is therefore proportional to the true net mass of flow.

Although the primary object of the present invention is to cancel the effects due to internal convection, the loop configuration of the present invention also minimizes external convection currents in mass flow meters with or without sensor insulation.

The advantages of the present invention, both as to its construction and mode of operation, will be readily appreciated as the same becomes better understood by reference to the following detailed description when considered in connection with the accompanying drawings in which like reference numerals designate like parts throughout the figures.

BRIEF DESCRIPTION OF THE DRAWINGS

FIG. 1 is a detailed schematic view of a mass flow sensor system in accordance with the present invention and associated orientation diagram;

FIG. 2 is a view of a flow sensor element in accordance with an alternative embodiment;

FIG. 3 is a force diagram applied to a portion of a tilted sensing tube;

DETAILED DESCRIPTION

Figure 4:
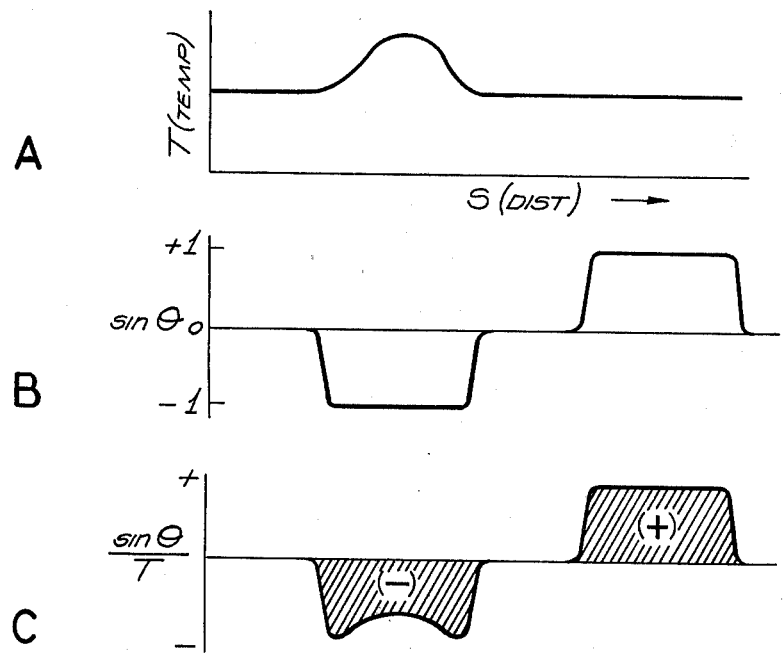
FIG. 4 illustrates graphically the mathematical analysis of attitude sensitivity in a conventional sensing tube.

Referring to FIG. 1 there is shown an exemplary embodiment of the mass flow sensor system in accordance with the principles of the invention. The system comprises two fluid paths, one of which is formed by a conduit 10 and the other by a sensing tube 12. The sensing tube 12 is connected across a longitudinal portion of the conduit 10 and is adapted to receive fluid therefrom through an inlet 13 communicating with its interior. Downstream of the inlet 13, the fluid diverted into tube 12 is returned to conduit 10 through an outlet 14. In accordance with the well known technique of flow splitting, the flow characteristics of one of the two fluid passageways can be reproduced in the other, so that measurements taken along the sensing tube 12 are valid also for the mass rate of flow in the conduit 10.

Intermediate the inlet 13 and the outlet 14 the sensing tube 12 comprises a loop 15 shaped as a single-turn helix with a cross-over base 16, and providing a continuous fluid path throughout the tube. The loop 15 is disposed in a plane normal to the direction of fluid flow in the conduit 10 and is made as co-planar as possible to prevent rotation about the base 16. In an embodiment preferred for the sake of compactness and shown in FIG. 1, the loop 15 is oriented so as to extend toward the conduit 10, i.e., the loop 15 is proximal to the conduit 10. Referring to FIG. 2, the invention also comprises a configuration in which the loop 15' depending from the base 16', points away from the conduit 10', i.e., is distal therefrom.

The sensing and signaling means used in the sensor system comprise an upstream sensor 17 and a downstream sensor 18, in the form of coil segments connected to each other to form a single, temperature-sensitive resistance wire wound around a portion of the external surface of the loop 15, and having a centertap 19. In an alternative embodiment (not shown) the centertapped single coil arrangement may be replaced by two separate sensor elements adjacent to each other, with an upstream sensor element closer to the inlet end and the downstream sensor element closer to the output end of the sensing tube.

The sensors 17 and 18 are symmetrically disposed on the loop 15 with respect to its centerline of symmetry of shape. A wire termination support 20 attached to the outer surface of the loop 15 on the downstream side, and a corresponding wire termination support 21 on the upstream side are equidistantly spaced from the centerline and link the free ends of sensor coils 17 and 18, respectively, to a bridge circuit 22 of conventional design. The bridge circuit 22 comprises a first bridge resistor 23 and a second bridge resistor 24, as well as a D.C. power supply 25 which is connected at one side to the junction of the sensor elements 17 and 18 at the centertap 19, and on the other side, through a switch 26, to the junction of the bridge resistors 23 and 24. Output signals from the bridge circuit 22 are coupled from a first output terminal 27 and a second output terminal 28. The first output terminal 27 is connected to the junction of the upstream sensor element 17 and the bridge resistor 23, and the second output terminal 28 is connected to the junction of the downstream sensor element 18 and the second bridge resistor 24.

In operation, when the switch 26 is closed, current flows through the sensor elements 17 and 18 and causes them to generate heat, thus raising the temperature of the sensing tube 12 around which the sensors are wound. Heating of the elements 17 and 18 also increases their resistance. At zero fluid flow through the tube 12 the sensor elements 17 and 18 have the same temperature. The bridge output is therefore balanced and produces a zero reading across the terminals 27 and 28. Fluid entering the input end 13 of the tube 12 carries the heat generated by the sensors 17 and 18 downstream and shifts the temperature profile along the tube, to provide a temperature differential between the sensors 17 and 18. As fluid flow increases in the tube 12, the temperature of the upstream sensor 17 as well as its resistance decreases, while simultaneously the temperature of the downstream sensor 18 as well as its resistance increases. The output voltage of the bridge 22 at terminals 27 and 28 therefore increases in nearly linear proportion to the flow rate.

Means can be provided to make the bridge circuit 22 independent of environmental variables, such as changes in the ambient temperature, which affect the resistance of the sensor coils 17 and 18. One such means, suggested in the above-identified application Ser. No. 381,455, consists in providing a constant current source or sources in place of the bridge resistors 23 and 24 (FIG. 1), but it is to be understood that other arrangements or circuit components may be used to achieve the same effect.

The interposition of the loop 15 in the flowpath of the tube 12 stabilizes the bridge circuit 22 and reduces the attitude-sensitivity of the device. In a non-modified, conventional system, without a loop, a balanced bridge ratio, showing zero output for zero flow is obtained only in a horizontally aligned conduit. When the conduit is rotated about a tilt angle with respect to the horizontal axis, gravity-induced convection forces distort the temperature gradients, so that output voltage signals are generated even if there is no flow. In a vertical, uninsulated conduit, external convection effects amounting to ± 50% and up of full scale sensor output—depending on the density of the fluid and other factors—are not uncommon and must be added to the effects of internal convection (which are not trivial for high-density fluids, as mentioned above).

Fluid flow through the loop 15 cancels the effects of both internal and external convection forces. In the attitude shown in FIG. 1 with conduit 10 along the x-axis, the addition of convection heat to the fluid temperature in the upstream portion of the loop 15 is subtracted as the fluid traverses the downstream portion of the loop and completes the passage. In a preferred embodiment of the invention the centerline of symmetry of the shape of the loop 15 is the same as the centerline of temperature distribution at no flow at which the bridge output is balanced.

The reduction of convection effects over the flowpath can be further illustrated by mathematical analysis as follows. For the sake of clarity certain simplifying assumptions have been made with regard to fluid properties and flow characteristics which, however, do not bear upon the validity of the qualitative conclusions.

The gravity force of an element of a gas in a tube is $$dF_g = \rho g dV$$

where
$\rho$ = density,
$g$ = gravity acceleration, and
$V$ = volume.

Referring to FIG. 3, in the direction of the flow stream $$dF_s = \rho g \sin\theta\, dV$$

where $\theta$ = tilt angle.
In terms of differential pressure on the element $$dPs = \frac{dF_s}{A} = \rho g \sin\theta \frac{dV}{A} = \rho g \sin\theta\, ds$$

where
A = cross-sectional area of the tube and
s = length of the flowpath.
For a perfect gas at essentially constant pressure the density is a linear function of the temperature $$\rho = \frac{P}{RT}$$

where
p = pressure
T = absolute temperature, and
R = gas constant.
Therefore, $$dPs = \frac{Pg \sin\theta}{RT} ds$$

The condition for the absence of convection, that is the absence or reduction of thermally induced differential pressure in the flowpath is satisfied if the integral over the convection path is zero, that is if $$\Delta Ps = \frac{Pg}{R} \oint \frac{\sin\theta \, ds}{T} = 0$$

assuming that P = constant.

Figure 5:
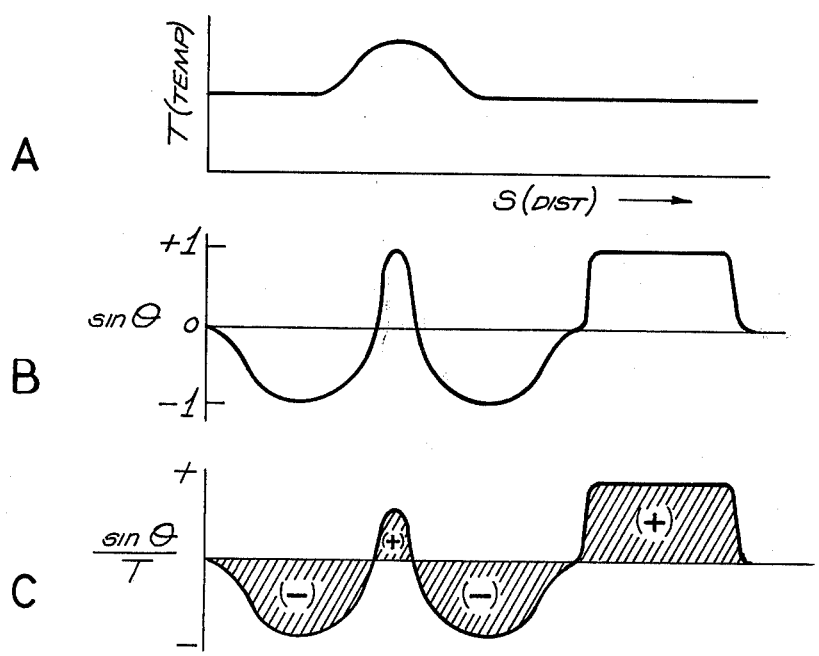
FIG. 5 illustrates graphically the mathematical analysis of attitude sensitivity in a sensing tube constructed in accordance with the present invention.

Referring to FIGS. 4 and 5, using tilt angle θ, and absolute temperature T, graphical illustrations of the integral compare the convection pressure in a conventional mass flow sensor system (FIG. 4) with that in a system modified according to the present invention (FIG. 5). Graph 4c, referring to an unmodified system and a vertical flowpath, shows that the reduced density in the heated sensor area causes the positive and negative portions of the pressure differential to be unequal, so that a pressure difference exists and a convection current results. The corresponding graph for the modified, loop-containing system, shows that the area of reduced density can be adjusted to equalize the positive and negative portions of the pressure differential and eliminate or neutralize convection currents. Balancing of the two portions is primarily a function of the loop size: if the loop is infinitesimally small, the tilt error, that is the effect of convection currents and the inequality of the positive and negative areas of the integral are the same as in non-modified sensor systems. In a larger loop the counteracting effect of the reversed direction flow becomes larger, so that the positive portion of the integral decreases with respect to the negative portion. I prefer a loop 15 having a diameter of about 0.2 to about 5 times the length of the heated portion of the sensing tube. I have found that a loop with a diameter approximately equal to the length of the heated portion of the sensing tube is best adapted to eliminate tilt errors at all tilt angles and thereby to eliminate the attitude sensitivity of mass flow sensor systems.

To test for optimum performance, mass flow sensors of various geometrical design in accordance with the present invention were balanced for zero output at no flow in the horizontal attitude, rotated about a 90° tilt angle for vertical upward flow and for vertical downward flow, and checked for signal output at no flow, all with oxygen at 1000 psi. A comparison of the voltages generated by modified sensor systems having a loop in the sensing tube, with voltages generated by non-modified sensor systems of conventional structure is given in the following Table.

Tilt Sensitivity at zero flow for O₂ at 1000 psi.

| Disposition | System without loop volts[3] | System with loop |
|---|---|---|
| Horizontal (no tilt) | 0.030 ± 0.003[1] | 0.000 ± 0.004[2] |
| Vertical (90° tilt) upward flow | +0.300 | 0.012 ± 0.018[2] |
| Vertical (90° tilt) downward flow | −0.280 | 0.004 ± 0.029[2] |

[1]results of two readings
[2]mean of seven readings.
[3]full scale flow rate corresponds to 5.000 volts.

As is evident in the above tabulation, interposition of a loop in the sensing tube of a mass flow sensor system significantly reduces signal error caused by attitude sensitivity.

The present system has been described as measuring the flow rate of a fluid. It should be understood that the term fluid is meant to encompass a liquid, a vapor or a gas which is flowing in the sensing tube. It will be appreciated that interposition of a loop in the sensing tube, besides reducing the attitude-sensitivity of the flow meter at any tilt angle, enables monitoring of instantaneous changes in flow direction, because calibration can be made at any attitude and is not restricted to the horizontal orientation of a conduit. This is useful not only, for example, for rockets and other spacecraft vehicles, where the flow must be measured at rapid changes in attitude and for different values of gravitational acceleration, but for a large number of other applications in the field of fluid technology.

I claim:

1. In apparatus for measuring the rate of mass flow of a fluid in a first conduit wherein a sensing conduit is communicatingly connected thereto by inlet means and outlet means and including self heating sensor elements on said sensing conduit intermediate said inlet means and outlet means, means for heating said sensor elements and detecting a temperature differential between said sensor elements, the improvement according to which said sensing conduit defines at least one helix loop intermediate said inlet means and outlet means and forming a continuous passageway providing reversal flow of said fluid therebetween, said loop being substantially in a plane parallel to the direction of flow of fluid in said first conduit.

2. The improvement in accordance with claim 1 wherein said loop is a single-turn helix.

3. The improvement in accordance with claim 1 wherein said loop is substantially symmetrical about a centerline of shape.

4. The improvement in accordance with claim 1 wherein said loop is proximal to said first conduit.

5. The improvement in accordance with claim 1 wherein said loop is distal from said first conduit.

6. The improvement in accordance with claim 1 wherein said sensor elements comprise two coil segments formed of temperature-sensitive resistance wire wound around the outer surface of said loop.

7. The improvement in accordance with claim 1 wherein said sensor elements are constituted by a centertapped coil formed of temperature-sensitive resistance wire wound around the outer surface of said loop, the coil material between one end of said coil and said centertap forming one of said sensor elements and the coil material between the other end of said coil and said centertap comprising another of said sensor elements.

8. The improvement in accordance with claim 1 wherein said sensor elements are formed to heat a predetermined length of said loop and wherein the diameter of said loop is about 0.2 to about 5 times said predetermined length.

9. The improvement in accordance with claim 8 wherein the diameter of said loop is approximately the same dimension as said predetermined length.

10. In a method for measuring the flow rate of a fluid in a conduit in which fluid is diverted from said conduit to flow along a path in a first direction past self heating sensor elements and returned to said conduit and wherein temperature differentials between said sensor elements are determined as a measure of said flow rate, the improvement according to which said diverted fluid is directed to flow in a direction reverse from said first direction along a portion of said path, in the configuration of at least one helix loop, prior to said return thereof, said loop configuration being substantially in a plane parallel to the direction of flow of fluid in said conduit.

11. The improvement in accordance with claim 10 wherein said loop configuration is a single-turn helix.

12. The improvement in accordance with claim 10 in which said loop configuration is substantially symmetrical about a centerline of shape.

13. The improvement in accordance with claim 10 wherein said loop is configured to be proximal to said conduit.

14. The improvement in accordance with claim 10 wheren said loop is configured to be distal to said conduit.

15. The improvement in accordance with claim 10 wherein said sensor elements are formed to heat said fluid along a predetermined length of said loop configuration and wherein the diameter of said loop configuration is about 0.2 to about 5 times said predetermined length.

16. The improvement in accordance with claim 15 wherein the diameter of said loop configuration is approximately the same dimension as said predetermined length.

17. A sensing member for use in a mass flow meter in connection with a fluid flow conduit thereof, comprising a length of tubing in the form of at least one helix loop, the opposite ends of said tubing defining a plane and being formed for connection to said fluid flow conduit, and loop being substantially in said plane, self-heating sensor elements on said loop and means for connecting an electrical bridge circuit to said sensor elements.

18. The sensing member of claim 17 wherein said loop is a single-turn helix.

19. The sensing member of claim 17 wherein said loop is substantially symmetrical about a centerline of shape.

20. The sensing member of claim 17 wherein said loop is formed to be connected proximal to said conduit.

21. The sensing member of claim 17 wherein said loop is formed to be connected distal from said conduit.

22. The sensing member of claim 17 wherein said sensor elements comprise two coil segments formed of temperature-sensitive resistance wire wound around the outer surface of said loop.

23. The sensing member of claim 17 wherein said sensor elements are constituted by a centertapped coil formed of temperature-sensitive resistance wire wound around the outer surface of said loop, the coil material between one end of said coil and said centertap forming one of said sensor elements and the coil material between the other end of said coil and said centertap comprising another of said sensor elements.

24. The improvement in accordance with claim 12 wherein said sensor elements are formed to heat a predetermined length of said loop and wherein the diameter of said loop is about 0.2 to about 5 times said predetermined length.

25. The improvement in accordance with claim 24 wherein the diameter of said loop is approximately the same dimension as said predetermined length.

* * * * *

UNITED STATES PATENT AND TRADEMARK OFFICE
CERTIFICATE OF CORRECTION

PATENT NO. : 4,056,975
DATED : November 8, 1977
INVENTOR(S) : Dan B. LeMay

It is certified that error appears in the above-identified patent and that said Letters Patent are hereby corrected as shown below:

Column 4, line 57, "p" should be --P--.

Column 7, line 27, "and" should be --said--.

Column 8, line 21, "12" should be --17--.

Signed and Sealed this

Twenty-first Day of February 1978

[SEAL]

Attest:

RUTH C. MASON
*Attesting Officer*

LUTRELLE F. PARKER
*Acting Commissioner of Patents and Trademarks*